July 21, 1964        R. S. PATCH ETAL        3,141,573

DISPENSING FREEZER WITH FLAVOR SELECTION

Filed Nov. 1, 1960

INVENTOR.
ROBERT S. PATCH
HARVEY F. SWENSON
BY Barnes & Seed
ATTORNEYS

INVENTOR.
ROBERT S. PATCH
HARVEY F. SWENSON
BY Barnes & Seed
ATTORNEYS

July 21, 1964 R. S. PATCH ETAL 3,141,573
DISPENSING FREEZER WITH FLAVOR SELECTION
Filed Nov. 1, 1960 3 Sheets-Sheet 3
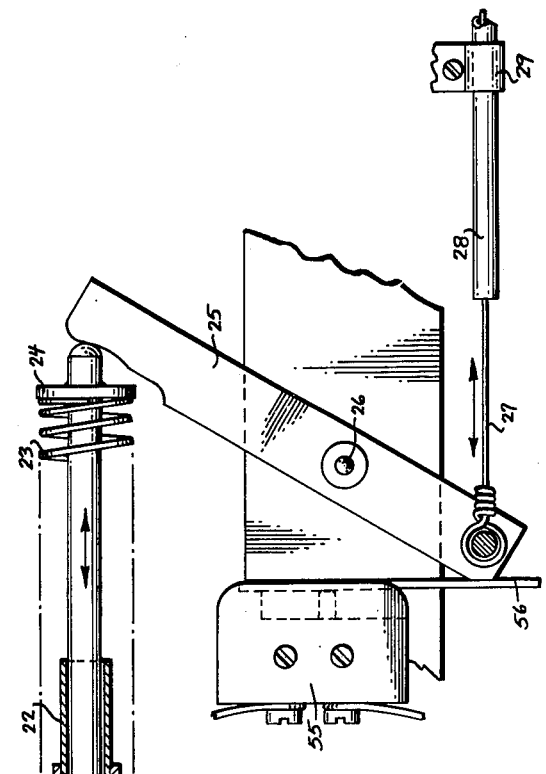
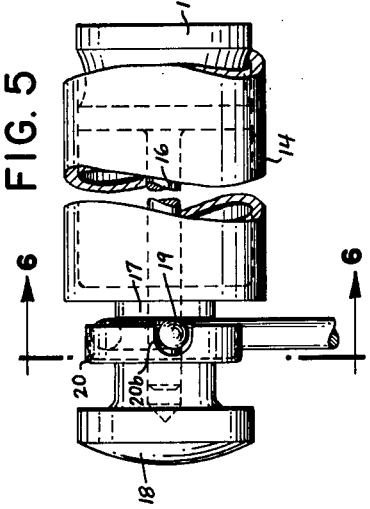
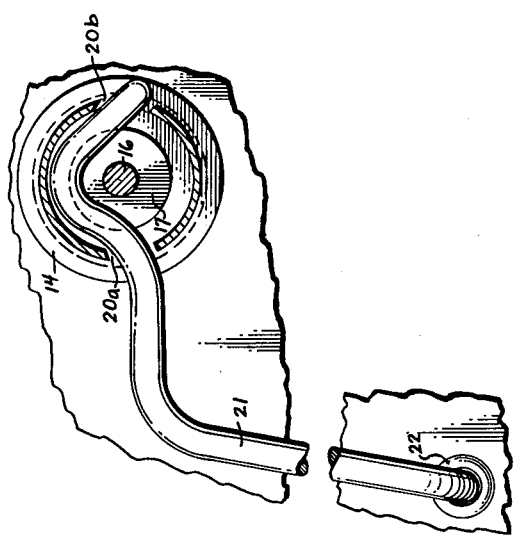
INVENTOR.
ROBERT S. PATCH
HARVEY F. SWENSON
BY Barnes & Seed
ATTORNEYS

United States Patent Office 3,141,573
Patented July 21, 1964

3,141,573
DISPENSING FREEZER WITH FLAVOR
SELECTION
Robert S. Patch, Bainbridge Island, and Harvey F. Swenson, Seattle, Wash., assignors to Sweden Freezer Manufacturing Co., Seattle, Wash., a corporation of Washington
Filed Nov. 1, 1960, Ser. No. 66,582
8 Claims. (Cl. 222—129.1)

The present invention relates to dispensing freezers, and more particularly to flavoring dispensing and mixing mechanisms for automatically delivering selected of a variety of flavors while the frozen product is dispensed to a container and for mixing the selected flavor with the frozen product in the container during the dispensing operation.

The invention aims to provide particularly simple, economical, and reliable such mechanisms which can be treadle actuated leaving the operator's hands free as for holding the container.

A further object is to provide an unusually simple and effective means for opening and closing the discharge gate of a dispensing freezer.

Another object of the invention is to provide an arrangement for dispensing freezers whereby depression of any of several flavor selecting levers or treadles results in not only delivery of the selected flavoring, but also in the opening of the discharge gate for delivery of the frozen product and in the starting of a flavoring-frozen product mixing beater.

Still a further aim is the providing of an improved mechanism for actuating a horizontally sliding discharge gate which can be readily disconnected for ease of cleaning.

The foregoing and other objects and advantages in view will appear and be understood in the following description and claims, the invention consisting in the novel construction and in the adaptation and combination of parts hereinafter described and claimed.

In the accompanying drawings:

FIGS. 4 and 5 are detail side elevational views of parts of the discharge gate actuating mechanism;

FIG. 6 is a vertical sectional view taken along the line 6—6 of FIG. 5; and

Figure 1:
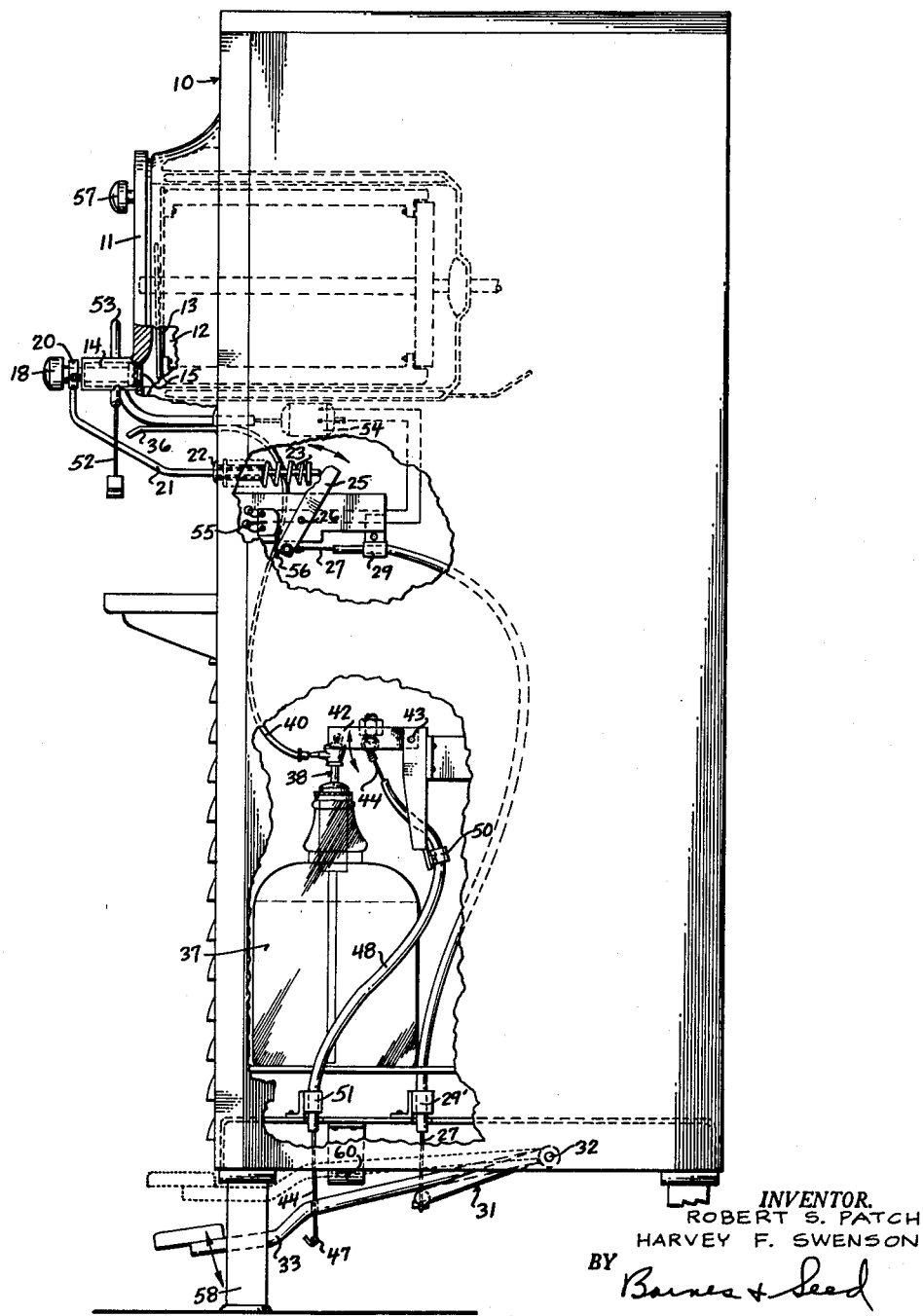
FIG. 1 is a side elevational view of a dispensing freezer equipped with the present invention, portions of the cabinet and other structure being broken away and some parts being in vertical section.
Figure 2:
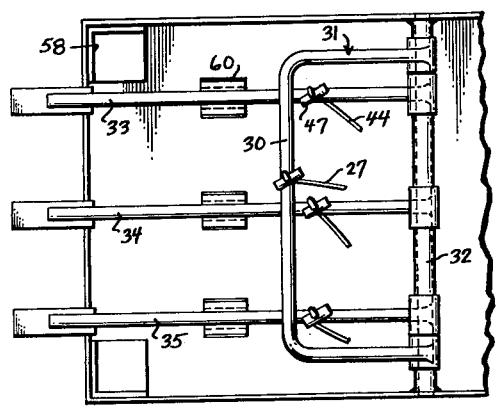
FIG. 2 is a fragmentary bottom plan view of the freezer.

Referring to the drawings, numeral 10 designates a dispensing freezer for slush ice or other frozen product having a removable cover 11 for its freezing cylinder 12. A dasher 13 operates in the cylinder and has an auger portion at the front for urging the frozen product toward a delivery gate which may take the form of a spigot 14 projecting from the cover 11 and controlled by a slide valve 15. The spigot has its outlet facing downwardly from a longitudinal through-bore the forward end of which is reduced to the stem 16 of the valve 15. This stem prolongs forwardly from the spigot and carries a washer 17 and screw head 18 defining a groove therebetween for receiving a hook 19 and a cupped keeper 20 therefor having its rim slotted at 20a–b to interfit with the hook. The latter is formed at the end of a gate-actuating slide rod 21 which is journaled in a sleeve 22 extending through the frame of the freezer adjacent the rim of the cover 11. Such sleeve also receives a return spring 23 seating at the front against the frame and at the back on a retainer ring 24 anchored on the rod near the rear end thereof.

Bearing against said rear end is a lever 25 pivoted at 26 and operated by a cable 27 which is threaded through a conduit 28. This conduit has a fore-and-aft portion fixed by a screw clamp 29 to the freezer frame and then bends downwardly and is anchored to the frame at the bottom by a similar clamp 29'. At its lower end the cable 25 projects beyond the conduit and is connected to the cross-member 30 of a U-shaped swing frame 31 working on a shaft 32.

Also pivoted on the shaft 32 in overlying relation to the cross-member 30 are a set of treadles shown as three (33–35) in number for purposes of example. These treadles are exposed at the front of the freezer for foot actuation.

It will be apparent that the cross-member 30 will be depressed responsive to depression of any of the treadles and that such a depression tensions the cable 27, responsively swings the lever 25 against the slide rod 21 in opposition to the return spring 23, and thereby pulls the slide valve 15 to an open position to deliver the frozen product to an underlying paper cup or other suitable receptacle. When the treadle is released the spring 23 operates on the slide rod 21 to close the valve and return-swing the lever 25. This lever swing pulls upwardly on the cable 27 to return the swing frame and treadle to their inactive position.

Figure 3:
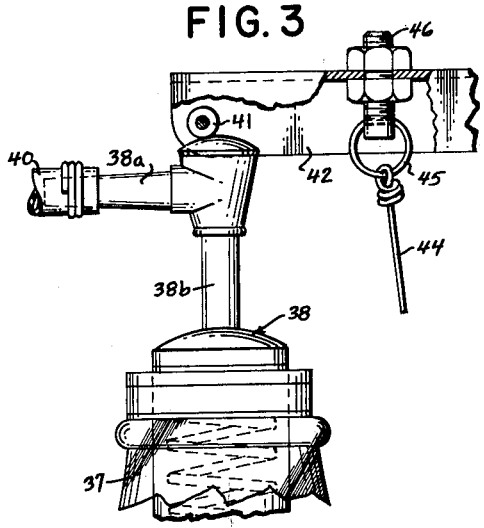
FIG. 3 is a detail side elevational view of part of the pump actuating mechanism.

A second function of the treadles is to operate a set of flavoring supply units for delivering selected flavoring syrups to spouts 36 which project beneath the spigot 14 for discharging into the paper cup while frozen product is being dispensed thereto. Since each of these units can be identical only one has been shown in the drawings, such including a jug 37 or other flavoring syrup container, a pump 38 mounted on the jug, and a flexible tube 40 leading from the discharge spigot 38a of the pump to one of the spouts 36. The pump 38 may be of the type shown in United States Patent No. 2,362,080, and is actuated by depression of a spring-loaded hollow plunger 38b, each stroke of the plunger serving to deliver a charge of flavoring syrup from the jug. As shown in FIG. 3, the head 38c of the plunger is engaged by a roller 41 which is journaled at the free end of a channel-shaped lever 42 vertically swingable at 43 on the freezer frame. The lever 42 is actuated by a cable 44 secured thereto via a ring 45 and bolt 46 and having its lower end extending downwardly through a bore in the related treadle and fitted with a terminal stop 47. A conduit 48 anchored top and bottom by clamps 50–51 guides the cable 44. With this arrangement, it can be readily seen that depression of a treadle results in delivery of a respective flavoring syrup to one of the spouts 36.

However, it should be noted from FIG. 1 that when a treadle is inactive, the related cable stop 47 is spaced therebelow so that the treadle must travel downwardly a given distance before effecting tensioning of the cable and responsive depression of the related pump plunger 38b by the respective lever 42, whereas no such slack or override is present in the cable 27 as respects the cross-member 30 of the swing frame 31. The purpose of this arrangement is to cause the discharge valve 15 to reach a partly open position and commence the discharge of frozen product before flavoring is delivered.

A beater 52 having a flexible drive through a guide tube 53 from an electric motor 54 is mounted to depend into the paper cup to which frozen product and flavoring is being dispensed. It is desired to automatically activate the beater at the start of the dispensing operation so that the frozen product and selected flavoring will be thoroughly mixed by the time the paper cup is filled. To achieve this result the electrical control circuit for the motor 54 includes a self closing micro-switch 55 which is normally held open by a leaf 56 in turn engaged by the heel of the lever 25 between dispensing operations. When one of the treadles is depressed to dispense frozen product and a slected flavoring, the resulting swing of the lever 25 relieves the pressure on the leaf 56 and permits the micro-switch 55 to close and thereby start the motor 54 to drive the beater 52 at the start of the dispensing operation. When the treadle is released to stop dispensing by action of the return spring 23 the resulting return-swing of the lever 25 again acts to open the switch 55 and stop the beater.

To gain access to the freezing cylinder 12 for cleaning, the head 18 is unscrewed to permit the keeper 20 to be forwardly unlocked from the valve 16. This releases the terminal hook 19 of the slide rod 21 so that the latter can be turned counter-clockwise in the sleeve 22 as viewed from the front of the freezer, thereby swinging the hook downwardly free of interference with the cover 11. The guide tube 53 for the beater drive is also journaled in the freezer frame so that it can be likewise swung from in front of the cover 11 thus enabling the latter to be removed by unscrewing the thumb screws 57 which hold it in position. With the cover off, disassembly is completed by withdrawing the slide valve 15 from the back of the spigot 14 and the dasher 13 from the open front of the freezing cylinder.

For sanitary reasons it is preferred that the cabinet of the dispensing freezer be raised above the floor level as by legs 58. To aid in access to the resulting floor space beneath the cabinet for cleaning thereof there is provided a group of twin-leaved spring clips 60 which are anchored on the underside of the cabinet. These clips are arranged to grip the treadles if the latter are pushed upwardly beyond their normal position into engagement with the clips as shown by the broken line position of the treadle 33 in FIG. 1. Moderate foot pressure on the treadles suffices to release them from the clips when the floor cleaning operation is completed.

Figure 7:
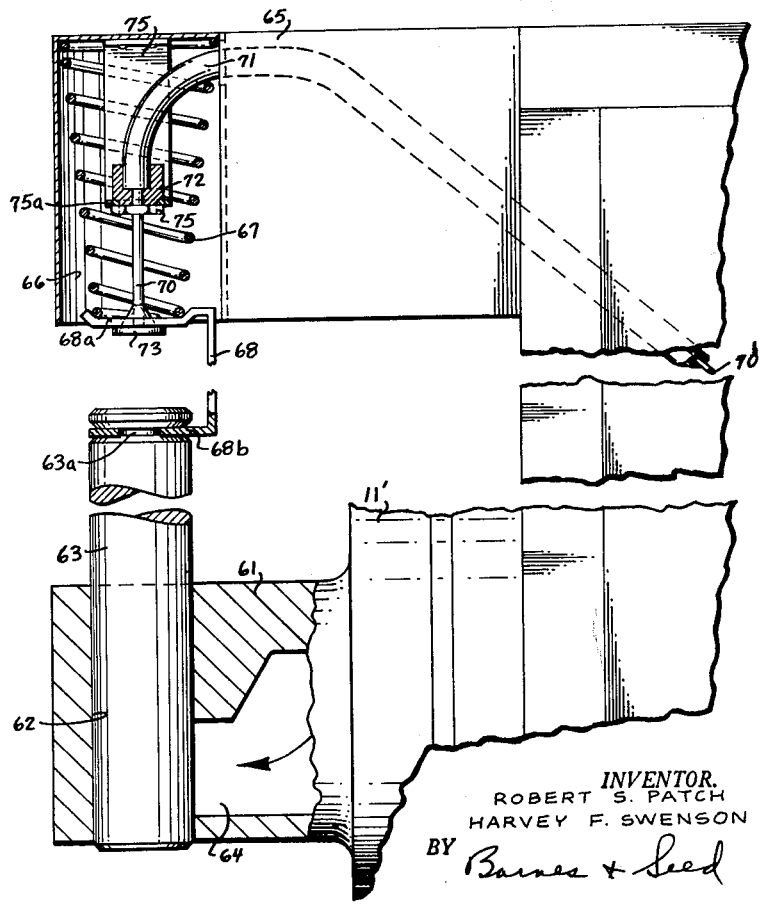
FIG. 7 is a fragmentary side elevational view with parts broken away showing a modified discharge gate and actuating mechanism therefor.

In FIG. 7 a modified discharge gate arrangement has been shown in which the cover 11' for the freezing cylinder has a spigot 61 formed with a vertical bore 62 for a slide valve 63. This bore 62 intersects a discharge passage 64 leading from the back face of the cover. Projecting from the freezer cabinet above the spigot 61 is a housing 65 which presents a chamber 66 vertically alined with the slide valve 63 and open at the bottom. A return spring 67 is seated against the roof of this chamber and bears against the downwardly dished upper leg 68a of an upright generally U-shaped connector 68. The lower leg 68b of the connector is laterally slotted from one of its side edges to detachably interfit with a circumferential groove 63a formed at the head of the slide valve 63.

Lifting of the connector 68 to thereby open the valve 63 in opposition to the spring 67 is performed by a cable 70 which is threaded through a conduit 71. This cable may connect for operation directly on the swing frame 31 in the same manner as the cable 27. The conduit 71 passes through two of the upper coils of the spring 67 and is seated in a counter-bore formed in the upper end of a generally cylindrical adapter 72. On the other hand, the cable 70 is threaded completely through this adapter and is secured to a terminal washer 73 which has an upwardly struck center portion seated in an opening formed in the upper connector leg 68a. The adapter 72 is necked at its lower end to seat upon an interfit with a cross-web 74a provided by a generally U-shaped bracket 74 which depends through the center of the spring 67 from connection with the roof of the chamber 66. This adapter neck is of sufficient length to depend beneath the cross-web 74a and is threaded to receive a nut 75.

From the above description of the modified gate arrangement it is believed apparent that when the cable 70 is tensioned as by depression of a treadle assembly at the lower end thereof, the resulting upward pull on the connector 68 will lift the valve 63 to open position in opposition to the spring 67. Then when the treadle assembly is released the spring 67 returns the valve to its closed position and while so doing, pulls on the upper end of the cable 70 and thereby lifts the treadle assembly back to inactive position.

While the slide valve operating mechanisms of the present invention have been described as activated for frozen product discharge by depression of any of several flavor control treadles acting on a swing frame in turn connected to a cable, it is intended that such mechanisms be also usable if desired to dispense frozen product without accompanying flavor dispensing. Accordingly, it will be obvious that in such a case the swing frame 31 can be elongated to serve as a treadle to directly receive a foot for depression.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

We claim:

1. In combination, a dispensing freezer having a gate for controlling the delivery of frozen product therefrom, flavoring delivery spouts adjacent said gate and external of said freezer, respective delivery means arranged to supply said spouts with flavoring when activated, a respective pivoted lever for each delivery means interconnected therewith to activate it when the lever is moved, and a single gate opening means operatively associated with said gate and arranged to be activated responsive to swinging movement of any of said levers in the direction activating the respective delivery means whereby such movement of a selected one of said levers results in both delivery of a respective flavoring and of frozen product.

2. In combination, a dispensing freezer having a gate for controlling the delivery of frozen product therefrom, an electric circuit with a normally open switch, flavoring delivery spouts adjacent said gate, respective delivery means arranged to supply said spouts with flavoring when activated, a respective lever means for each delivery means interconnected therewith to activate it when the lever means is depressed, and means operatively associated with said gate and switch and arranged to be activated responsive to a depression of any of said lever means, whereby a depression of a selected one of said lever means results in delivery of a respective flavoring, delivery of frozen product and closing of said electric circuit.

3. In combination, a dispensing freezer having a discharge spigot with a gate for controlling the delivery of frozen product therefrom, a liquid delivery spout adjacent said gate, pump means carried by said freezer and having a self-returning plunger, said pump means being arranged to supply said spout with liquid when said plunger is pushed, a lever pivoted in said freezer and operatively engaging said plunger to push it responsive to swing of said lever in a given direction, and treadle means operatively interconnected with said lever for swinging the lever in said given direction responsive to depression of the treadle means.

4. In combination, a dispensing freezer having a gate controlling the delivery of frozen product therefrom, flavoring delivery spouts adjacent said valve, plural pump means carried by said freezer and each having a self-returning plunger, said pump means being arranged to supply respective of said spouts with flavoring when their said plungers are pushed, levers pivoted on said freezer and each operatively engaging one of said plungers to push it responsive to swing of the lever in a given direction, treadles operatively interconnected with respective of said levers for selectively swinging them in said given direction responsive to depression of the treadles, a slide rod operatively connected to said gate for opening and closing it responsive to endwise actuation of the rod, spring means yieldingly urging said rod in the endwise direction corresponding to closing of said gate, a vertically swinging frame extending beneath said treadles and arranged to be depressed responsive to a depression of any of the treadles, and a lever operatively engaging said slide rod and operatively interconnected with said swing frame for urging said rod endwise in opposition to said spring means responsive to a depression of the swing frame, whereby a depression of a selected one of said treadles results in both delivery of a respective flavoring and of frozen product.

5. In combination, a dispensing freezer having a housing and a horizontal slide valve external of said housing for controlling the delivery of frozen product from the freezer, flavoring spouts extending from within said housing adjacent said valve, plural pump means in said housing and each having a self-returning plunger, said pump means being arranged to supply respective of said spouts with flavoring when their said plungers are pushed, levers pivoted on said housing and each operatively engaging one of said plungers to push it responsive to swing of the lever in a given direction, treadles exposed without said housing and operatively interconnected by respective cables with respective of said levers for selectively swinging them in said given direction responsive to depression of the treadles, a slide rod journaled in said housing and operatively connected at one end to said valve for opening it responsive to endwise actuation of the rod away from the housing, said rod extending by its other end into said housing, spring means seated against said housing and yieldingly urging said rod endwise toward said housing for closing said valve, a vertically swinging frame extending beneath said treadles and arranged to be depressed responsive to a depression of any of the treadles, a reverse lever pivoted on said housing and engaging said other end of the rod for pushing the rod endwise in opposition to said spring means to open said valve, and a cable operatively interconnecting said reverse lever and swing frame so that depression of the latter swings the reverse lever such as to push said rod and open the valve, whereby a depression of a selected one of said treadles results in both delivery of a respective flavoring and of frozen product.

6. In combination, a dispensing freezer having a gate for controlling the delivery of frozen product therefrom, flavoring delivery spouts adjacent said gate, respective pump means arranged to supply said spouts with flavoring when activated, a respective treadle means for each pump means interconnected therewith to activate it when the treadle means is depressed, and a single gate opening means operatively associated with said gate and arranged to be activated responsive to a depression of any of said treadle means, whereby a depression of a selected one of said treadle means results in both delivery of a respective flavoring and of frozen product.

7. In combination, a dispensing freezer having a gate for controlling the delivery of frozen product therefrom, flavoring delivery spouts adjacent said gate, respective plunger-type pumps arranged to supply said spouts with flavoring when their plungers are actuated, said plungers being self-returning, generally parallel treadles interconnected with respective said pumps and arranged to actuate their plungers when selectively depressed, a cross-member beneath said treadles and arranged to depress responsive to a depression of any of the treadles, and self-returning means operatively interconnecting said cross-member and gate so that the gate is opened responsive to depression of the cross-member, whereby depression of a selected said treadle results in both delivery of a respective flavoring and of frozen product.

8. In combination, a dispensing freezer having a gate for controlling the delivery of frozen product therefrom, flavoring delivery spouts adjacent said gate, respective pump means arranged to supply said spouts with flavoring when activated, a respective treadle means for each pump means interconnected therewith to activate it when the treadle means is depressed, all of said treadle means having a common swing axis, a swing frame pivoted in said axis and extending beneath all of said treadle means so as to be depressed responsive to depression of any of said treadle means, and gate opening means operatively associated with said gate and arranged to be activated responsive to a depression of said swing frame, whereby a depression of a selected one of said treadle means results in both delivery of a respective flavoring and of frozen product.

References Cited in the file of this patent
UNITED STATES PATENTS

| | | |
|---|---|---|
| 2,167,547 | Holderle et al. | July 25, 1939 |
| 2,667,039 | Wehrwein | Jan. 26, 1954 |
| 2,706,385 | Topping | Apr. 19, 1955 |
| 2,734,347 | Fischer | Feb. 14, 1956 |
| 2,740,264 | Thompson | Apr. 3, 1956 |
| 3,044,277 | Barnum | July 17, 1962 |
| 3,045,719 | Burks et al. | July 24, 1962 |
| 3,078,471 | Knibb | Feb. 26, 1963 |